US010433184B2

(12) United States Patent
Lee et al.

(10) Patent No.: US 10,433,184 B2
(45) Date of Patent: Oct. 1, 2019

(54) METHOD AND APPARATUS FOR DIRECTING AN ANTENNA BEAM BASED ON A LOCATION OF A COMMUNICATION DEVICE

(71) Applicant: Motorola Mobility LLC, Chicago, IL (US)

(72) Inventors: Philip G Lee, Evanston, IL (US); Mark Braun, Arlington Heights, IL (US); Ranjeet Gupta, Chicago, IL (US); Mary Hor-Lao, Chicago, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 120 days.

(21) Appl. No.: 14/986,346

(22) Filed: Dec. 31, 2015

(65) Prior Publication Data
US 2017/0195893 A1    Jul. 6, 2017

(51) Int. Cl.
*H04W 16/28*    (2009.01)
*H04W 72/04*    (2009.01)
*H04L 5/00*    (2006.01)
*H04B 7/06*    (2006.01)
*H04W 84/12*    (2009.01)
*H01Q 3/36*    (2006.01)

(52) U.S. Cl.
CPC .......... *H04W 16/28* (2013.01); *H04B 7/0617* (2013.01); *H04L 5/006* (2013.01); *H04W 72/046* (2013.01); *H04W 72/0453* (2013.01); *H01Q 3/36* (2013.01); *H04W 84/12* (2013.01)

(58) Field of Classification Search
CPC ............. H04W 16/28; H04W 72/0453; H04W 72/046; H04W 84/12
See application file for complete search history.

(56) References Cited

U.S. PATENT DOCUMENTS

| | | |
|---|---|---|
| 5,327,143 A | 7/1994 | Goetz et al. |
| 5,917,446 A | 6/1999 | Greenspan |
| 6,195,559 B1 | 2/2001 | Rapeli et al. |
| 6,512,481 B1 | 1/2003 | Velazquez et al. |
| 6,862,433 B2 | 3/2005 | Callaway |
| 6,917,337 B2 | 7/2005 | Iida et al. |
| 2007/0287384 A1 | 12/2007 | Sadri et al. |
| 2009/0232010 A1 | 9/2009 | Li et al. |
| 2010/0167664 A1 | 7/2010 | Szini |
| 2012/0062424 A1 | 3/2012 | Hwang |
| 2012/0064841 A1 | 3/2012 | Husted et al. |
| 2012/0071203 A1 | 3/2012 | Wong |
| 2013/0040655 A1 | 2/2013 | Keidar |
| 2014/0038656 A1* | 2/2014 | Navda ................... H04W 24/10 455/509 |

(Continued)

*Primary Examiner* — Feben Haile

(57) ABSTRACT

A method is performed by a first communication device for directing an antenna beam based on a location of a second communication device. The method includes receiving first location data that indicates the location of the second communication device. The first location data is received over a first communication channel. The method further includes determining, based on the first location data, first antenna beam parameters for directing an antenna beam in order to communicate with the second communication device over a second communication channel.

17 Claims, 12 Drawing Sheets

(56) References Cited

U.S. PATENT DOCUMENTS

| | | | |
|---|---|---|---|
| 2014/0128032 A1* | 5/2014 | Muthukumar | H01Q 3/00 |
| | | | 455/411 |
| 2014/0192927 A1 | 7/2014 | Kim | |
| 2015/0022405 A1* | 1/2015 | Shi | G01R 29/10 |
| | | | 343/703 |
| 2015/0045048 A1* | 2/2015 | Xu | H04W 4/023 |
| | | | 455/452.1 |
| 2015/0230263 A1* | 8/2015 | Roy | H04W 36/0083 |
| | | | 455/452.2 |
| 2016/0285583 A1* | 9/2016 | Kasher | H04L 1/0001 |
| 2017/0194706 A1 | 7/2017 | Lee et al. | |

\* cited by examiner

| | ANTENNA BEAM PARAMETERS | LOCATION |
|---|---|---|
| 606 | $\theta_2$ | $X_1, Y_1, Z_1$ |
| 608 | $\theta_3$ | $X_2, Y_2, Z_2$ |
| 610 | $\theta_4$ | $X_3, Y_3, Z_3$ |
| 612 | $\theta_5$ | $X_4, Y_4, Z_4$ |
| 614 | $\theta_N$ | $X_N, Y_N, Z_N$ |

*FIG. 6*

METHOD AND APPARATUS FOR DIRECTING AN ANTENNA BEAM BASED ON A LOCATION OF A COMMUNICATION DEVICE

FIELD OF THE DISCLOSURE

The present disclosure relates to controlling antenna beams in a communication device, and more particularly to a method and apparatus for directing an antenna beam based on a location of a communication device.

BACKGROUND

Wireless communication technologies currently being developed continue to focus on improving a user's experience through, for instance, improving spectral efficiency and signal quality while providing for higher data rates and increased signal bandwidth and throughput. For example, many communication devices are now capable of implementing MIMO (Multiple-Input and Multiple-Output), which is a technology that can increase the capacity of a radio link by using multiple transceiver paths and corresponding antenna elements to exploit multipath propagation for communicating data between communication devices.

Directional or beam antennas are also becoming more widely used. These antennas are configured to focus narrower and higher gain antenna beams in specific directions to allow more precise targeting (e.g., transmission and/or reception) of wireless signals than omni-directional antennas. Moreover, technologies such as Wi-Fi used in wireless local area networks (WLANs) are enabling the development of communication devices that operate in multiple frequency bands (for instance tri-band-enabled devices that operate in the 2.4, 5, and 60 gigahertz (GHz) bands) and that are capable of both infrastructure and peer-to-peer communication. Accordingly, opportunities abound for developing methods and apparatus that take advantage of this breath of technology alternatives.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 6 illustrates a table 600 that can be used for determining antenna beam parameters for directing an antenna beam in accordance with an embodiment.

Figure 1:
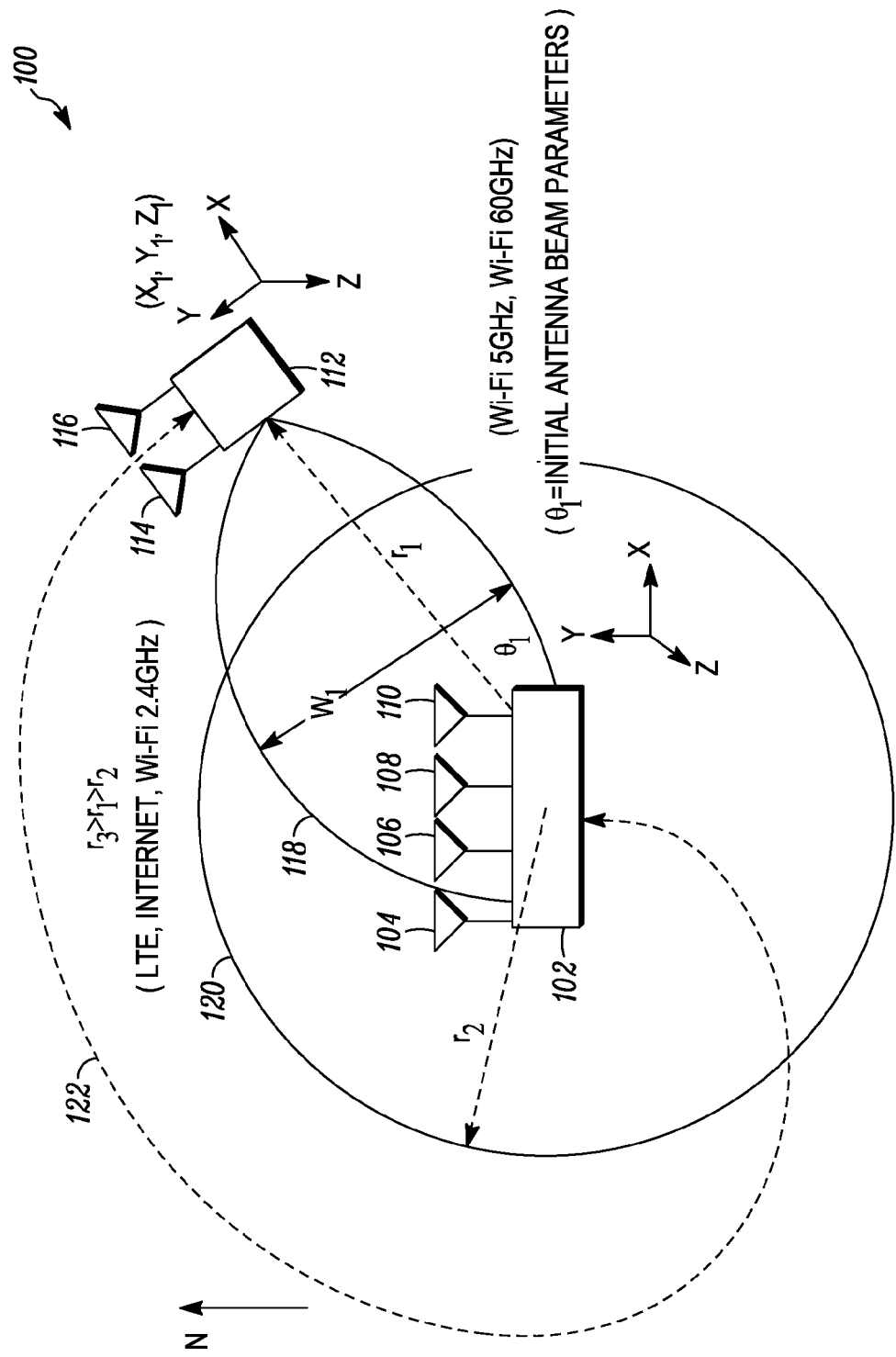
FIG. 1 is a schematic diagram illustrating an environment within which can be implemented methods and apparatus for directing an antenna beam in a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, an antenna beam of a first communication device is directed based on location and/or motion of a second communication device. An antenna beam is defined herein as radio frequency (RF) energy received into or radiated from one or more antenna elements, wherein the RF energy is characterized at least by a shape or pattern (e.g., beam width), spatial directionality, and gain. For the described embodiments, the antenna beam is directed through "beamsteering," which, as used herein, means the pointing of the antenna beam in a particular direction. Beamsteering can be accomplished manually and/or electronically. Manual beamsteering involves a change in the physical orientation of a communication device to change the direction of an antenna beam. Electronic beamsteering, also referred to herein as "beamforming" involves a communication device changing one or more antenna beam parameters including, but not limited to, changing phase and/or amplitude of a set of RF signals provided to two or more antenna elements and/or changing the combination of the antenna elements used in order to shape RF energy in space by changing beam width, directionality, gain, etc., of an antenna beam.

One embodiment is directed to a method performed by a first communication device, which includes receiving first location data that indicates the location of a second communication device. The first location data is received over a first communication channel. The method also includes determining, based on the first location data, first antenna beam parameters for directing an antenna beam in order to communicate with the second communication device over a second communication channel having a shorter communication range or distance than the first communication channel.

Another embodiment is directed to a first communication device configured for directing an antenna beam based on a location of a second communication device. The first communication device includes a processing element coupled to a communication interface, which includes a transceiver operatively coupled to an antenna system. The communication interface is configured to operate over a first communication channel to receive first location data that indicates the location of the second communication device. The communication interface is further configured to operate over a second communication channel. The processing element is configured to determine, based on the first location data, first antenna beam parameters for controlling the antenna system to direct an antenna beam in order to communicate with the second communication device using the second communication channel.

Another embodiment is directed to a method performed by a first communication device for directing an antenna beam based on motion. The method includes directing an antenna beam in a first direction. The method further includes receiving motion data that indicates movement of the first communication device or a second communication device. Moreover, the method includes determining, based on the motion data, a change in direction of the antenna beam from the first direction to a second direction toward the second communication device.

Yet another embodiment is directed to a first communication device configured for directing an antenna beam based on motion of a second communication device and/or its own motion. The communication device includes a processor coupled to an antenna beam steering mechanism. The antenna beam steering mechanism is configured to direct an antenna beam in a first direction. For one example, the antenna beam steering mechanism includes a set of antenna elements configured for beamforming. For another example, the antenna beam steering mechanism includes a vibration motor configured to change an orientation of the first communication device. The processor is configured to receive motion data that indicates movement of one or both of the first communication device and a second communication device. The processor is further configured to determine, based on the motion data, a change in direction of the antenna beam from the first direction to a second direction.

FIG. 1 illustrates a schematic diagram of an example environment 100 within which can be implemented methods and apparatus for controlling antenna beams in a communication device in accordance with some embodiments. The environment 100 includes a communication device 102 and a communication device 112 that are configured to communicate using various communication technologies, such as cellular and WLAN technologies. For purposes of the present teachings, communication device 102 is taken to have access point functionality for use in providing to the communication device 112 access, via a wireless connection, to one or more wide area networks (WANs), e.g., a cellular backhaul and/or the Internet, to which the access point 102 is connected.

For example, the devices 102 and 112 operate in multiple frequency bands. For a particular embodiment, the devices 102 and 112 are multi-band devices that operate in the 2.4, 5, and/or 60 GHz bands in accordance with various Wi-Fi standards including, but not limited to, 802.11 a, b, g, n, ac, and ad, and may also operate in accordance with Wi-Fi standards that support MIMO technologies including MIMO beamforming. To facilitate MIMO operation (e.g., MIMO 4×4 operation in the access point 102 and MIMO 2×2 operation in the device 112) and beamforming (MIMO or otherwise), the access point 102 includes antenna elements 104, 106, 108, and 110, and the communication device 112 includes antenna elements 114 and 116. The access point 102 can be a fixed access point, a Mobile Hotspot, or a portable or mobile device operating as a Wi-Fi Direct group owner. Example communication devices 112 include a smartphone, a cellular phone, a phablet, a tablet, a personal digital assistant, a mobile phone, a media player, a laptop, or another type of portable electronic device capable of communicating with an access point according to the disclosed embodiments.

Figure 2:
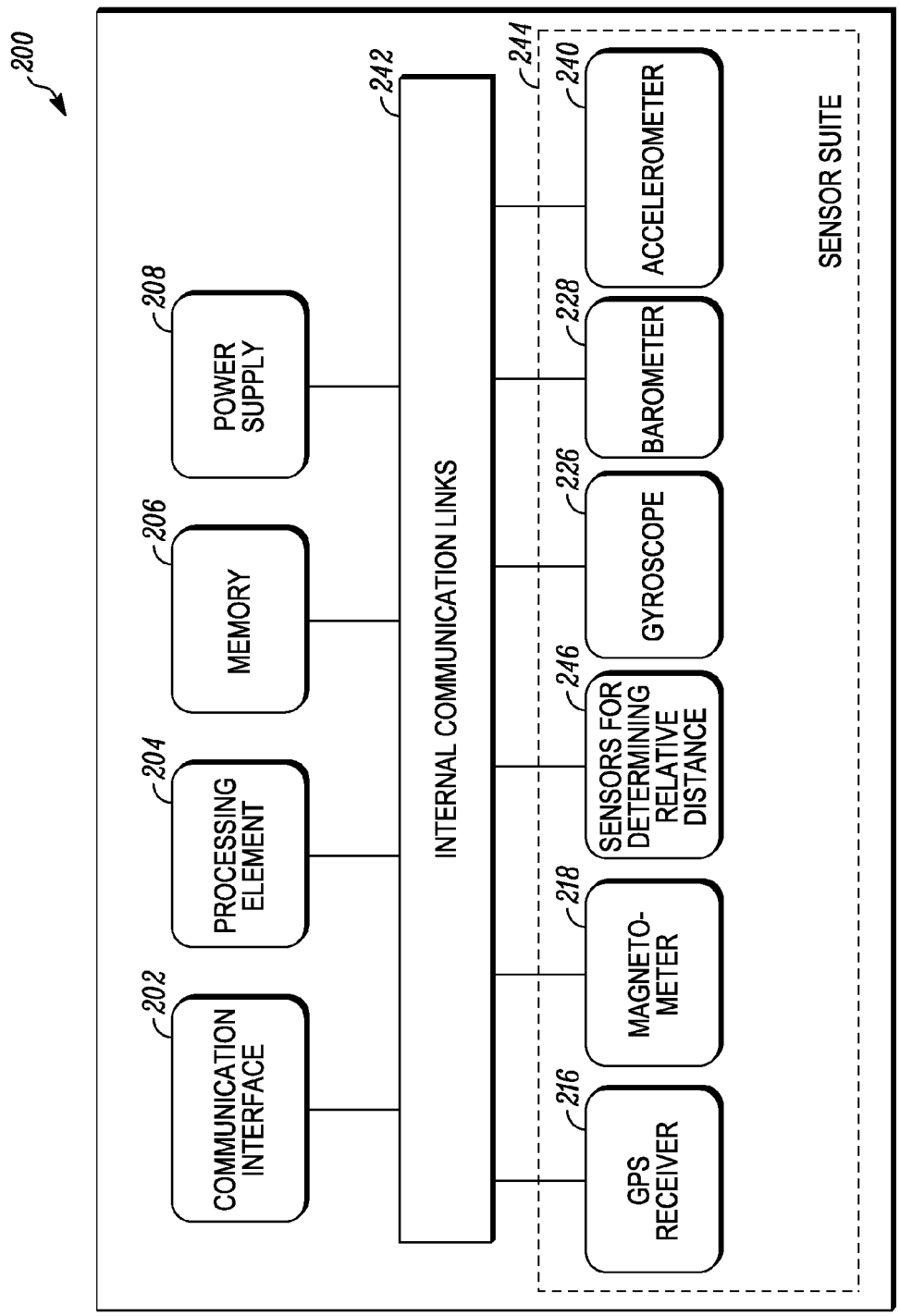
FIG. 2 is a block diagram illustrating example components of a communication device functioning as an access point and configured for directing an antenna beam in accordance with some embodiments.

FIG. 2 shows a block diagram illustrating example hardware components 200 of an access point, such as the access point 102, in accordance with the present teachings. As shown in FIG. 2, the elements or components 200 include a communication interface 202, a processing element or processor 204, a memory element 206, a power supply 208, and a sensor suite 244, which includes a GPS receiver 216, a magnetometer 218, a gyroscope 226, a barometer 228, an accelerometer 240, and sensors 246 for determining relative distance. As further illustrated, the components 200 are coupled to one another, and in communication with one another, by way of one or more internal or local communication links 242, for instance a bus or other interconnections such as various wires. The power supply or battery 208 provides power to the components 200.

A limited number of device components 202, 204, 206, 208, 242, and 244 are shown for ease of illustration, but other embodiments may include a lesser or greater number of such components. Moreover, other elements needed for a commercial embodiment of a device that incorporates the components shown, such as various input and output components that enable a user to interact with the communication device 102, are omitted from FIG. 2 for clarity in describing the enclosed embodiments.

For an embodiment, the communication interface 202 includes a transceiver system operatively coupled to an antenna system. For a particular embodiment, the transceiver system includes a Wi-Fi transceiver chip and a cellular transceiver chip. For some embodiments, the Wi-Fi transceiver chip is configured to conduct Wi-Fi communications in accordance with the Institute of Electrical and Electronics Engineering (IEEE) 802.11 (e.g., a, b, g, n, ac, or ad) standards and MIMO communication techniques. For other embodiments, the Wi-Fi transceiver chip instead (or in addition) conducts other types of communications commonly understood as being encompassed within Wi-Fi communications such as some types of peer-to-peer, e.g., Wi-Fi Direct™, communications, Neighbor Awareness Networking (NAN) aka Wi-Fi Aware™, and Mobile Hotspot operations. Further, in other embodiments, the Wi-Fi transceiver chip is replaced or supplemented with one or more other wireless transceivers employing ad hoc communication technologies such as HomeRF, Home eNodeB (Fourth Generation Long Term Evolution (4G LTE) femtocell), and/or other wireless communication technologies.

The antenna system includes, at a minimum, the antenna elements 104, 106, 108, and 110, which are active antenna elements that can be controlled for beamforming and, for some implementations, MIMO operation. However, the antenna system can include fewer or additional such active antenna elements. For example, the antenna elements 104, 106, 108, and 110 can be part of a fixed or adaptive phased array having hundreds of active antenna elements. For one particular embodiment, the communication interface 202 is configured for chip-based transmit beamforming, also referred to in the art as TxBF, wherein the phase or timing and/or amplitude of multiple RF signals provided to multiple antenna elements is adjusted to create an antenna beam having a particular directionality. For TxBF, the device that forms the antenna beam for transmitting frames is called a beamformer; and the receiver of the frames is the beamformee. For another embodiment, a particular combination of the antenna elements are selectively switched or connected by corresponding feed lines to the transceiver to radiate or receive RF energy in a particular direction.

The processor 204 represents hardware that facilitates multiple processing functionalities or capabilities in the access point 102. For one example, the processor 204 represents one or more digital signal processors (DSPs) that facilitate processing functionality performed by the Wi-Fi and/or cellular transceiver chips of the communication interface 202 to, for instance: adjust phase; frequency bands; antenna element combinations; and/or modulation scheme (e.g., binary phase-shift keying (BPSK), quadrature phase-shift keying (QPSK), 16-Quadrature Amplitude Modulation (QAM), 64-QAM, 256-QAM, etc.). For another example, the processor 204 represents hardware that provides main or core processing capabilities within the communication device 102 and, in an embodiment, serves as a primary processor, also referred to as a central processing unit (CPU), which processes computer-executable instructions to control operation of the device 102 and/or a main application processor. For another embodiment, the processor 204 represents hardware that provides secondary processing capabilities such as in connection with receiving and interpreting sensor input or data from the sensors 244.

The memory component 206 in various embodiments can include one or more of: volatile memory elements, such as random access memory (RAM); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the memory component 206 includes a region of shared memory accessible to various components 200 of the communication device 102, such as the processor 204 and the transceiver system of the communication interface 202.

For an embodiment, the sensors 244 detect various parameters or data points and provide, to the processor 204 in the form of sensor data (more particularly location data), an indication of what was detected. The processor 204 can then use this location data to determine, for instance, geographic position, orientation, and/or direction of the device 102. Moreover, for some embodiments, when similar location data is received from another device, such as the device 112, the processor 204 can use this additional data to determine relative orientation, location, and/or distance between devices 102 and 112. In one embodiment, the sensors 244 are separate sensors of the electronic device 102. Alternatively, the sensors 244 are combined within the same hardware such as in an integrated circuit manufactured using microelectromechanical systems (MEMS) technology. For a further embodiment, one or more of the sensors 244 are coupled to the device 102 as a peripheral, e.g., a USB peripheral or dongle.

For example, the GPS receiver 216 is configured to detect geographic position of the device 102 and provide location data such as geographic coordinates that represent, for instance, latitude, longitude, and/or elevation, e.g., in the form of Cartesian coordinates or polar coordinates. Alternatively or in combination, the processor 204 can execute a location application to determine geographic position of the device 102. The magnetometer 218 is configured to measure strength and direction of a magnetic field in space. Its sensor data can be used, for example, to indicate direction relative to the geographic cardinal coordinates, e.g., N (shown in FIG. 1), S, E, W. The gyroscope 226 is configured to generate and provide sensor data that indicates orientation of the device 102 along its three axes, e.g., the X, Y, and Z axes, based on rotation or angular momentum around the multiple axes. The barometer 228 is configured to generate and provide sensor data that indicates atmospheric pressure, which can be used to determine how high the device 102 is above sea level, which can result in improved GPS accuracy. The accelerometer 240 is configured to generate and provide sensor data that indicates acceleration that the device 102 is experiencing relative to freefall, which can be used to determine orientation of the device 102 along its three axes, based on linear motion and gravity.

The one or more sensors 246 generate and provide sensor data that facilitates determining relative distance between the device 102 and at least one other device. Such sensors can include, for example, radio frequency identification (RFID) sensors, presence detection sensors, sensors that enable determining round-trip time (RTT) between two devices, sensors that enable determining time of flight (TOF) between two devices, etc.

Accordingly, the GPS receiver 216, magnetometer 218, gyroscope 226, barometer 228, accelerometer 240, and sensors 246 can be used alone or in combination to indicate geographic position, motion, speed, velocity, acceleration, and/or orientation of the device 102, and/or relative distance between the device 102 and another device. For instance, the gyroscope 226 and accelerometer 240 can be used alone or in combination to indicate a display orientation (e.g., landscape or portrait) of the device 102, whether a screen of the device is facing up- or downward, or an orientation of the communication device 102 itself along multiple axes, e.g., the X, Y, and Z axes, fixed relative to the device 102. The magnetometer 218, gyroscope 226, barometer 228, and accelerometer 240 can be used alone or in combination to determine the relative orientation of the device 102 in space (e.g., azimuth, pitch, and roll with respect to North, level, and horizontal respectively) as well as orientation relative to another device, e.g., device 112, when the device 102 receives similar location data from the device 112. The accelerometer 240 can be used to derive speed and direction in which the device 102 is moving to indicate the velocity of the device 102. Other sensors (not illustrated) such as a gravity sensor can be used to measure relative orientation with respect to the Earth's gravitational field.

Figure 3:
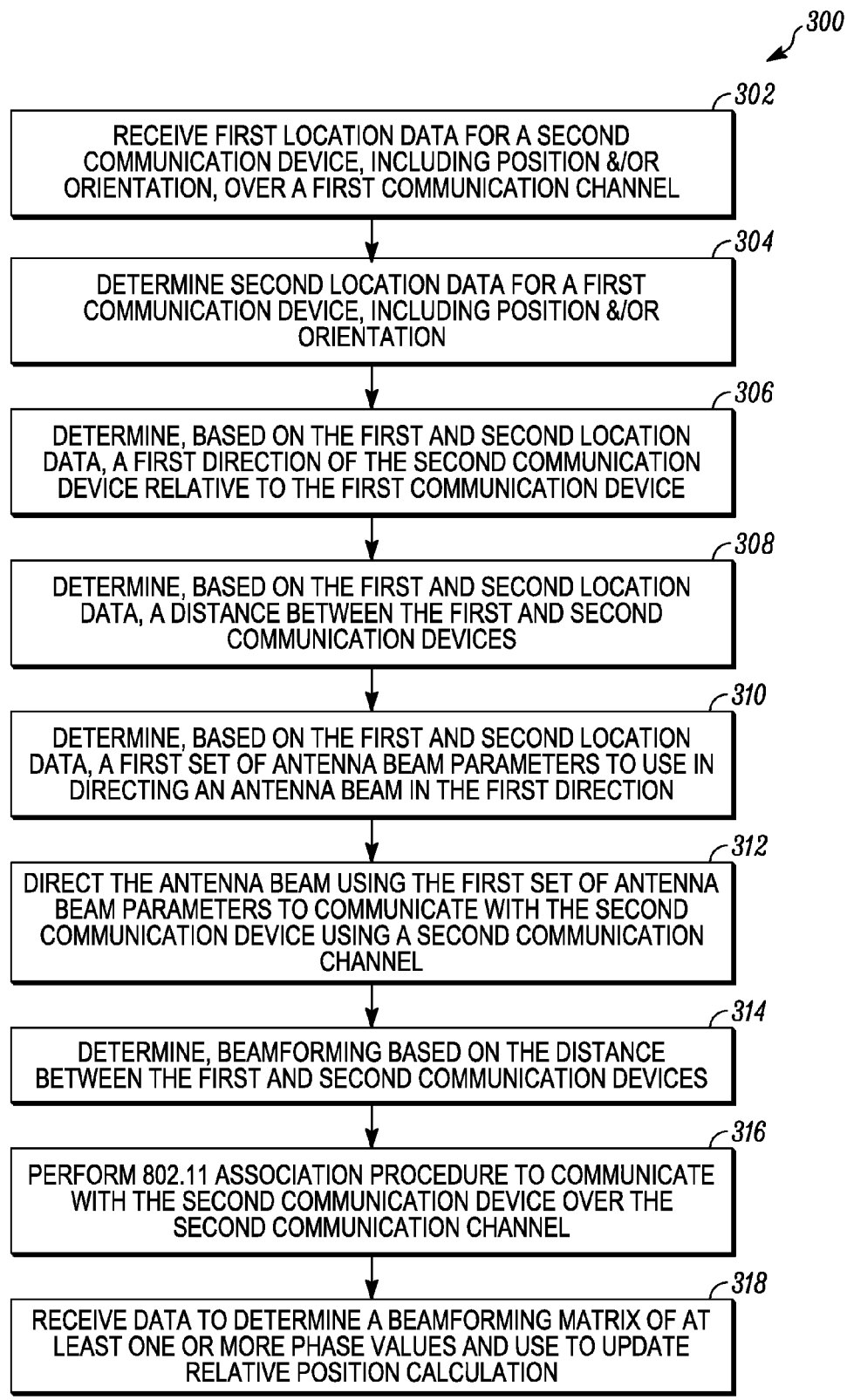
FIG. 3 is a flow diagram illustrating a method for directing an antenna beam in accordance with an embodiment.
Figure 5:
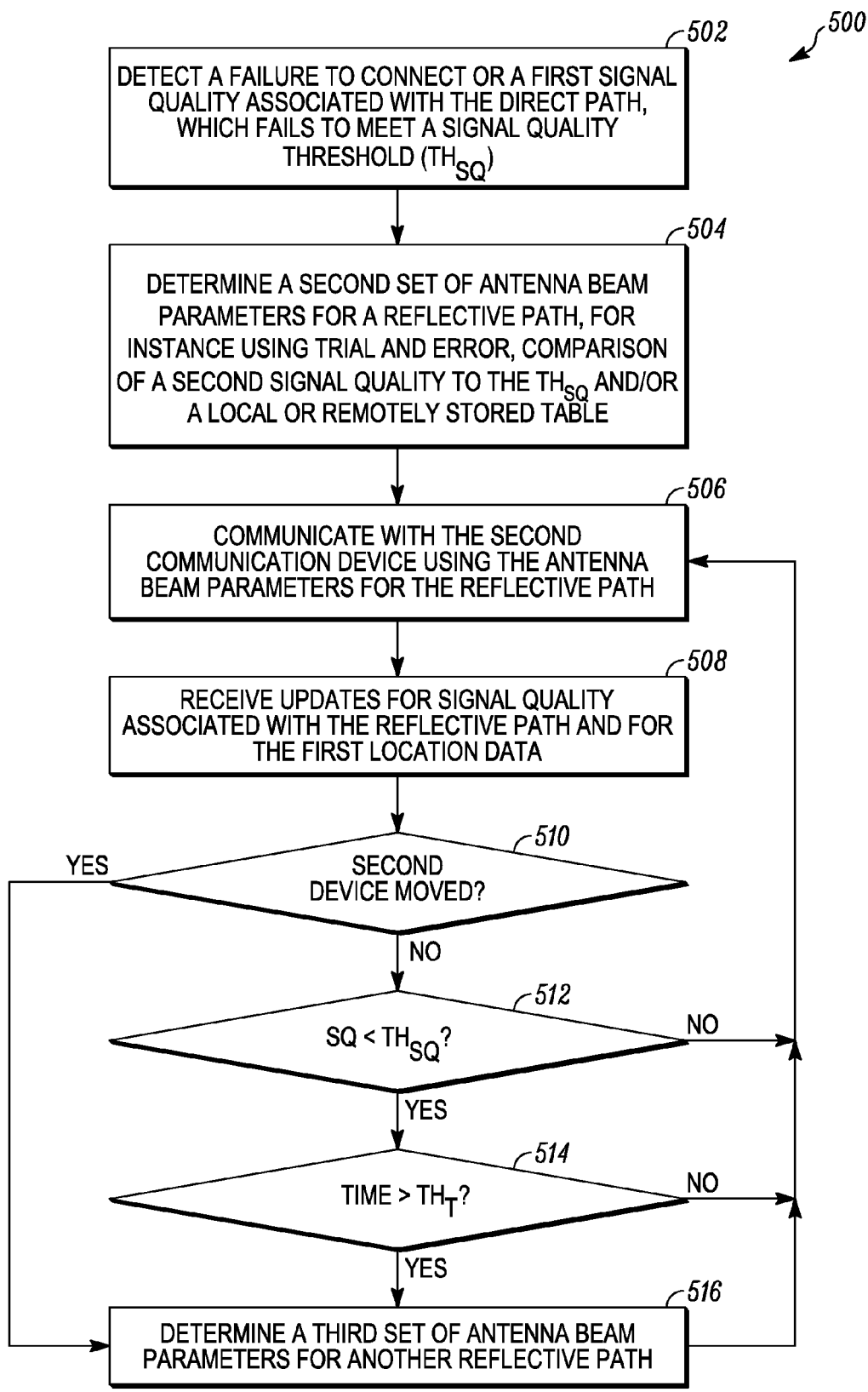
FIG. 5 is a flow diagram illustrating another method for directing an antenna beam in accordance with an embodiment.
Figure 8:
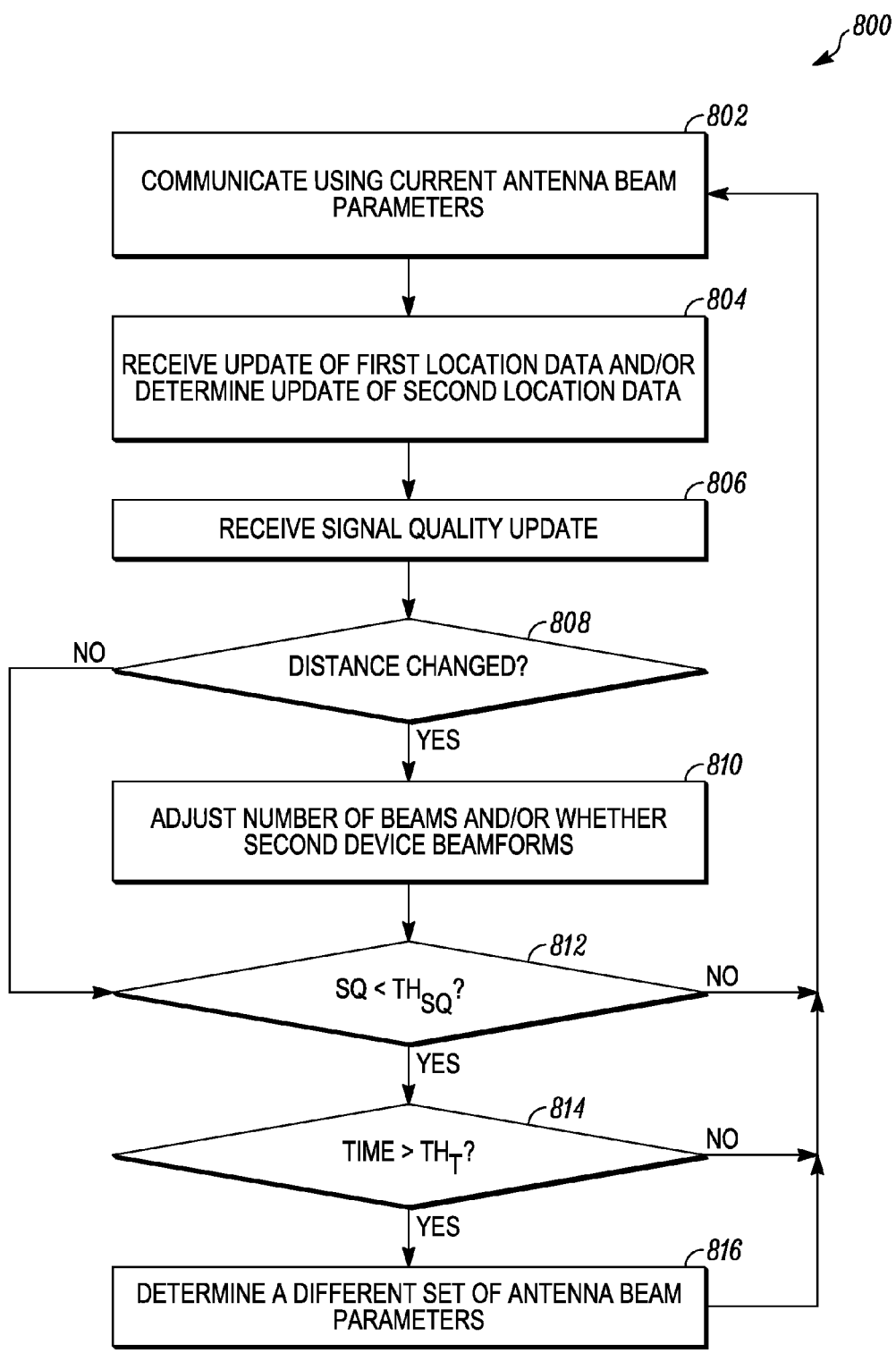
FIG. 8 is a flow diagram illustrating another method for directing an antenna beam in accordance with an embodiment.
Figure 10:
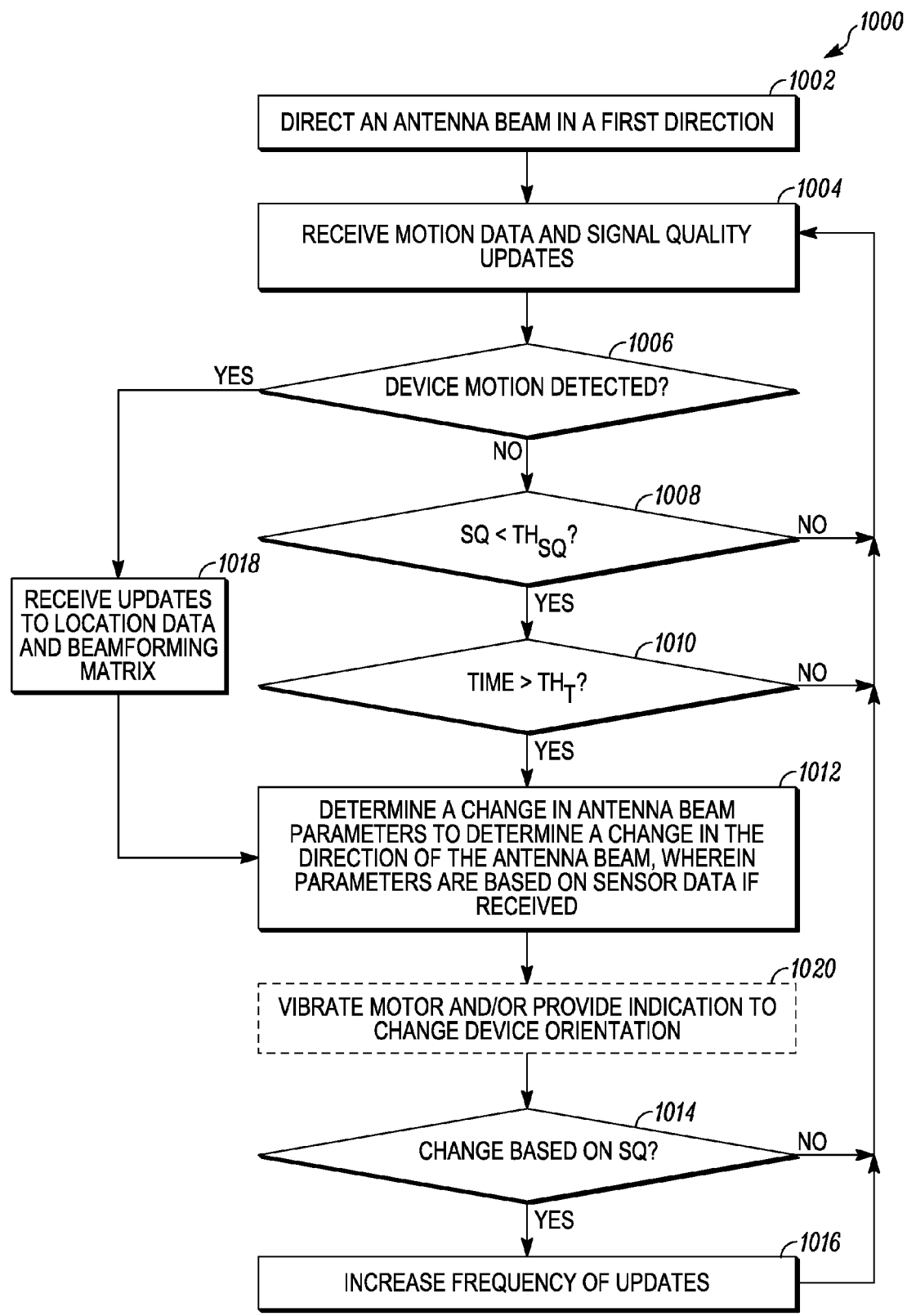
FIG. 10 is a flow diagram illustrating another method for directing an antenna beam in accordance with an embodiment.

FIG. 3 shows a flow diagram illustrating a method 300 performed by a communication device, taken to be the access point 102, for directing an antenna beam in accordance with the present teachings. For example, the method 300 can enable the access point 102 to determine antenna beam parameters to initialize or form an initial antenna beam, e.g., an antenna beam 122, to communicate with the device 112 sooner than is possible using prior art techniques. Although method 300 is described as being performed by the access point 102, the mobile device 112 could additionally perform the method 300. Moreover, both devices 102 and 112 can be configured to perform methods 500 illustrated by reference to FIG. 5, 800 illustrated by reference to FIG. 8, 1000 illustrated by reference to FIG. 10, and 1200 illustrated by reference to FIG. 12, wherein a mobile device 112 acting as a Mobile Hotspot or a Wi-Fi group owner could perform method 1200.

For a first example use case scenario for implementing method 300, the access point 102 is configured to perform an omnidirectional scan to detect or discover communication devices within a coverage area 120 that are seeking to connect to the Wi-Fi network. An omnidirectional scan is a scan for devices that is performed using one or more antenna elements without shaping the antenna beam using a beamforming technique. As illustrated, the coverage area 120 for the omnidirectional scan has a range of $r_2$. Normally, the device 102 is unable to detect those devices outside of the scan coverage area 120, such as the mobile device 112, for purposes of connecting them to the Wi-Fi network. However, the method 300 can enable the access point 102 to form an antenna beam 118, toward the device 112, which has width $W_1$ and has a range $r_1$ that exceeds the range $r_2$ of its scan coverage area 120. Moreover, the antenna beam 118 has a higher gain than the gain achievable when the device 102 performs the omnidirectional scan, to enable a higher signal quality.

For a second example use case scenario for implementing method 300, the environment 100 in which devices 102 and 112 are located has minimal reflective paths or minimal multipath, which makes it difficult or very time consuming for the access point 102 to collect enough multipath data to allow the access point 102 to calculate a prior art beamforming matrix to initialize an antenna beam. Accordingly, the devices 102 and 112 might be able to associate and communicate in the 2.4 GHz frequency band but, in the absence of the present teachings, cannot beamform in order to switch to one of the higher frequency bands, e.g., 5 GHz and/or 60 GHz, to obtain a higher signal quality. Accordingly, using method 300, device 102 can obtain location data to direct an antenna beam toward device 112 before performing 802.11 procedures for associating with device 112 and before exchanging information to construct a beamforming matrix.

Method 300 is described herein in the context of a WLAN network, wherein the devices 102 and 112 are configured to operate in accordance with Wi-Fi standards. However, the teachings are not limited to this illustrative context. Namely, method 300 includes the access point 102 receiving 302 first location data for a communication device, taken in this example to be the mobile device 112, over a first communication channel 122 having a range $r_3$. For a further embodiment, the device 102 and 112 exchange additional information over the channel 122 such as management frames, beacons, probe requests and responses, identifiers for the devices 102 and 112, Wi-Fi frequency bands supported by each device, additional information that might be exchanged during a Wi-Fi discovery process, etc.

Location data for a device is defined as data that indicates a location of the device, wherein at least a portion of the location data is not derived based on conditions of the channel over which the location data is sent but is instead based on data measured by or received into hardware sensors of the device. For example, the location data can be measured and/or derived from data from one or a combination of the sensor types mentioned above, which can be used to indicate location of the device in terms of geographic position, motion, speed, velocity, acceleration, distance, and/or orientation.

For a particular embodiment, the access point 102 receives 302 first location data that at least indicates an absolute geographic position of the device 112 in space. For the present example, geographic position is indicated using Cartesian coordinates. Accordingly, the access point 102 receives as location data for the mobile device 112 the geographic coordinates of $x_1$, $y_1$, $z_1$. As mentioned above, alternatively, absolute geographic position could be indicated using a polar coordinate system.

For a further embodiment, the access point receives 302 first location data that indicates communication device orientation. For example, the location data indicates the relative position of the device 112 based on a coordinate system that is fixed with respect to the device 112. As illustrated, the fixed coordinate system for both devices 102 and 112 is a Cartesian coordinate system with its x-axis and y-axis defined by a plane on the device, such as the device display, and its z-axis normal to the x-y plane. In such a case, a polar angle can be used to characterize the orientation of the device, for instance with respect to, e.g., North, level, and horizontal, and/or the Earth's gravitational field. Other orientation indicators based on a Cartesian and/or polar coordinate system can be used such as angle-of-arrival.

A communication channel, or channel for short (and also referred to herein as a link), is defined herein as a physical transmission medium, such as air for wireless communications or wire for wired or wireline communications, used to carry data or control information between two or more communication devices for any type of communication including, for instance, point-to-point, multicast, and broadcast communications. A channel or link can be further characterized by one or more parameters or characteristics including, but not limited to: a particular communication technology used to establish the channel (e.g., LTE, Wi-Fi, Generic Advertisement Service (GAS), cellular, Bluetooth, etc.); a frequency band within which the channel is established; a channel bandwidth; quality of service; etc. A channel or link between two devices may or may not include intermediary devices such as routers.

Accordingly, the channel 122 over which the location data is communicated can be established using any communication technology shared between the devices 102 and 112. For example, the channel 122 can be established using a cellular communication technology, such as an LTE channel, which has a range $r_3$ that exceeds both $r_2$ and $r_3$. Alternatively, the channel 122 can be: a Bluetooth link such as Bluetooth Low Energy (BLE); a link that enables devices 102 and 112 to communicate over the Internet; a Wi-Fi link established and communicated over using Wi-Fi technology; a link that enables the communication of GAS and/or Access Network Query Protocol (ANQP) messaging; a peer-to-peer or device-to-device link; a Neighborhood Area Network (NAN) link; a link established using Tunneled Direct Link Setup (TDLS); etc. The device 112 might be aware of the parameters needed to form the link 122 through an email hyperlink or previous communications with the access point 102, as examples. For another example, the device 112 establishes the link using protocol messaging associated with the particular communication technology protocol, wherein for at least some of these technologies, e.g., BLE, range $r_3$ might be less than both $r_2$ and $r_1$.

The access point 102 also determines 304 second location data for itself using sensor data provided by one or more of the sensors 244, as described above. For a particular embodiment, the second location data indicates geographic position and orientation of the access point 102. The access point 102 uses the first and second location data, for instance the geographic position of device 112 and its own geographic position and relative orientation, to determine 306 a direction of the mobile device 112. As used herein, the direction of the mobile device 112 indicates relative position and/or orientation between the devices 102 and 112. Known calculations and algorithms can be used to determine relative position including, but not limited to, trigonometric calculations, non-linear regression algorithms, studentized residuals, triangulation, etc.

Accordingly, based on the first and second location data, the access point 102 can determine 310 a first set of one or more antenna beam parameters, also referred to herein as first antenna beam parameters, to direct, point, or steer the antenna beam 118 in the direction of the mobile device 112. For an embodiment, the first antenna beam parameters are "initial" antenna beam parameters for initializing an antenna beam toward the device 112, for instance to enable the mobile device 112 to use the access point 102 to connect to the Internet to stream data. As shown, a polar angle $\Theta_1$ relative to the coordinate system of the access point 102 is used to indicate the beam 118 directionality, which results from the initial antenna beam parameters. Accordingly, the polar angle is used to refer, throughout this document, to one or more antenna beam parameters. Antenna beam parameters are defined as any parameters used to shape, direct, point, and/or steer an antenna beam in or toward a particular direction. The type of antenna beam parameters determined depends, at least in part, on the beamforming technique and the types of antenna elements used to form the antenna beam.

For one example, to change the directionality of the antenna beam when transmitting, a beamformer controls the phase and relative amplitude of the signal at each transmitter, in order to create a pattern of constructive and destructive interference in the resulting wavefront. Controlling phase in this context means changing when transmission starts. For a particular embodiment, the beamformer uses a fixed set of weightings and time-delays (i.e., phasings or phase values) to combine the signals from the antenna elements, primarily using only information about the location of the antenna elements in space and the wave directions of interest. Alternatively, the beamformer can be a simple beamformer wherein all the weights of the antenna elements can have equal magnitudes. The antenna beam is, thereby, steered to a specified direction only by selecting appropriate phases for each antenna element. Accordingly, for this type of beamforming technique, the antenna beam parameters include phase and can also include relative amplitude.

For another embodiment, an optimal combination of antenna elements is selected to focus patterns of radio energy in the right direction based on the inherent characteristics of the antenna elements themselves. For this type of beamforming technique, the antenna beam parameters indicate the particular combination of antenna elements that will need to be switched to the transmitters of the Wi-Fi chip set to shape or steer the antenna beam.

The access point 102 then directs 312 the antenna beam 118 using the first antenna beam parameters to communicate with the mobile device 112 using a second communication channel. For example, the second channel is characterized by one of the higher Wi-Fi frequency bands such as 5 GHz or 60 GHz. In general, the first channel 122 (used to communicate the first location data) and the second channel (for communicating using the established beam 118) are characterized by at least one different parameter. For one example, the first and second communication channels can be characterized by different frequency bands for a same wireless communication technology, such as being characterized by different frequency bands for Wi-Fi. For another example, the first and second communication channels are characterized by different communication technologies, wherein either the first or the second communication channel is a Wi-Fi channel.

Since the access point 102 has the location and has calculated the relative direction of the device 112, the access point 102 can establish the antenna beam with sufficient accuracy to see and connect to the device 112 even within an environment having minimal multipath or under conditions where the collection of multipath data needed to calculate a beamforming matrix is not yet possible based on the signaling protocol used to establish the second communication channel.

For this particular illustrative context, an 802.11 association procedure as defined in the standards must be performed and completed at 316 in order for the devices 102 and 112 to communicate over the second communication channel. Accordingly, the first set of antenna beam parameters is determined 312, based on the relative position calculated using the first and second location data, before completing the 802.11 association procedure with the device 112. Moreover, the multipath data for calculating 318 a beamforming matrix can, according to at least the 802.11 standards, only be obtained after completing the 802.11 association procedure to associate devices 102 and 112. Thus, for this implementation, the first set of antenna beam parameters determined from the calculated relative position of devices 102 and 112 is determined before obtaining the multipath data used for calculating the beamforming matrix, assuming that there is sufficient reflective paths in the environment to calculate such a matrix. It should further be noted that the calculated relative position can be used for steering an antenna array, in accordance with the present teachings, irrespective of whether device 102 calculates the beamforming matrix at 318.

For an embodiment, the beamforming matrix includes at a minimum one or more phase values (and amplitude weights depending on the type of antenna array) for steering an antenna beam. In one example, the device 112 provides to the device 102 the one or more phase values as the multi-path data for calculating the beamforming matrix to the device 102. For another example, the device 112 provides feedback regarding channel conditions as the multi-path data that enables the device 102 to calculate the beamforming matrix.

For yet another embodiment, the device 102 correlates the relative position calculation to the beamforming matrix determined at 318 to adjust the relative position calculations. This is useful, for instance, in indoor environments where GPS determinations may not be as accurate. In this way, more accurate relative position calculations can be used for beamforming as well as other applications of the device 102 and/device 112 that use or require relative position calculations. Updating the relative position calculations may further be useful where, as described by respect to other embodiments, the device 102 attempts to determine and use a reflective path to communicate with the device 112. Accordingly, the relative position of devices 102 and 112 can be calculated: at initiation of an antenna beam before 802.11 association of the devices 102 and 112; at the time of 802.11 association; or after 802.11 association; and either once or periodically updated using the beamforming matrix.

The 802.11 standards have included two ways for the beamformer to calculate the beamforming matrix for TxBF, implicit feedback and explicit feedback from the beamformee. For explicit feedback, the beamformee sends steering feedback directly to the beamformer, giving it instructions for optimizing the steered beams. The instructions include communication from the beamformee to the beamformer of what would work best for the beamformee in terms of the beamformer's transmit phases and other settings, given the client's current vantage point in the radio space. For implicit feedback, the beamformee sends training signals to the beamformer, which allow the beamformer to estimate the MIMO channel between the two stations and calculate its own steering matrix. No direct feedback is provided from the beamformee.

For a further embodiment, with regards to the method 300, the access point 102 determines 308, based on the first and second location data, a distance between the devices 102 and 112 and determines 314 beamforming based on this distance. For example, the distance can be calculated based on the Pythagorean Theorem using the absolute x, y, z geographic coordinates obtained for the two devices. Distance calculations can be alternatively calculated or can be fine-tuned using methodologies including, but not limited to, RTT and TOF. Further movement of either device 102 and 112 can be identified through changes in RTT or TOF, which can be used to trigger the repeating of all or some combination of functional blocks 302 to 314.

For one particular implementation, determining 314 beamforming includes determining, based on the distance between the devices 102 and 112, a number of antenna elements to enable for directing the antenna beam using the first antenna beam parameters. For example, when the device 112 is closer to the device 102, the access point 102 can generate a shorter and wider antenna beam and still effectively communicate with the device 112, while reducing battery drain. For another implementation, determining beamforming includes detecting that the distance between the devices 102 and 112 exceeds a distance threshold, and causing the device 112 to beamform in order to communicate with the device 102 using the second communication channel. This effectively extends the range of the communications between devices 102 and 112, which improves the signal quality. Additional details regarding a communication device adjusting beamforming based on relative distance changes between itself and another device are described later by reference to FIGS. 7 and 8.

For other embodiments, explained in additional detail by reference to some of the remaining figures, the access point 102 receives updates to the first location data during a time frame and determines updates to signal quality during the time frame. For example, certain triggers such as a change in RTT of TOF can be used as a basis for obtaining updates to the first location data, second location data, and/or the signal quality. The access point 102 can determine signal quality using or based on any number of parameters including, but not limited to, bit error rate, packet error rate, signal strength (e.g., RSSI), dropped packets, etc. The access point 102 can then determine using this updated data whether any change to the signal quality is due to movement of one or both of devices 102 and 112 or whether the change to the signal quality is due to an environmental condition. When the access point 102 determines that the change in signal quality is due to environmental conditions, it can, for instance, decide to maintain the current set of antenna beam parameters for directing the antenna beam or temporarily direct the antenna beam along a different path than the path associated with the current set of antenna beam parameters.

Figure 4:
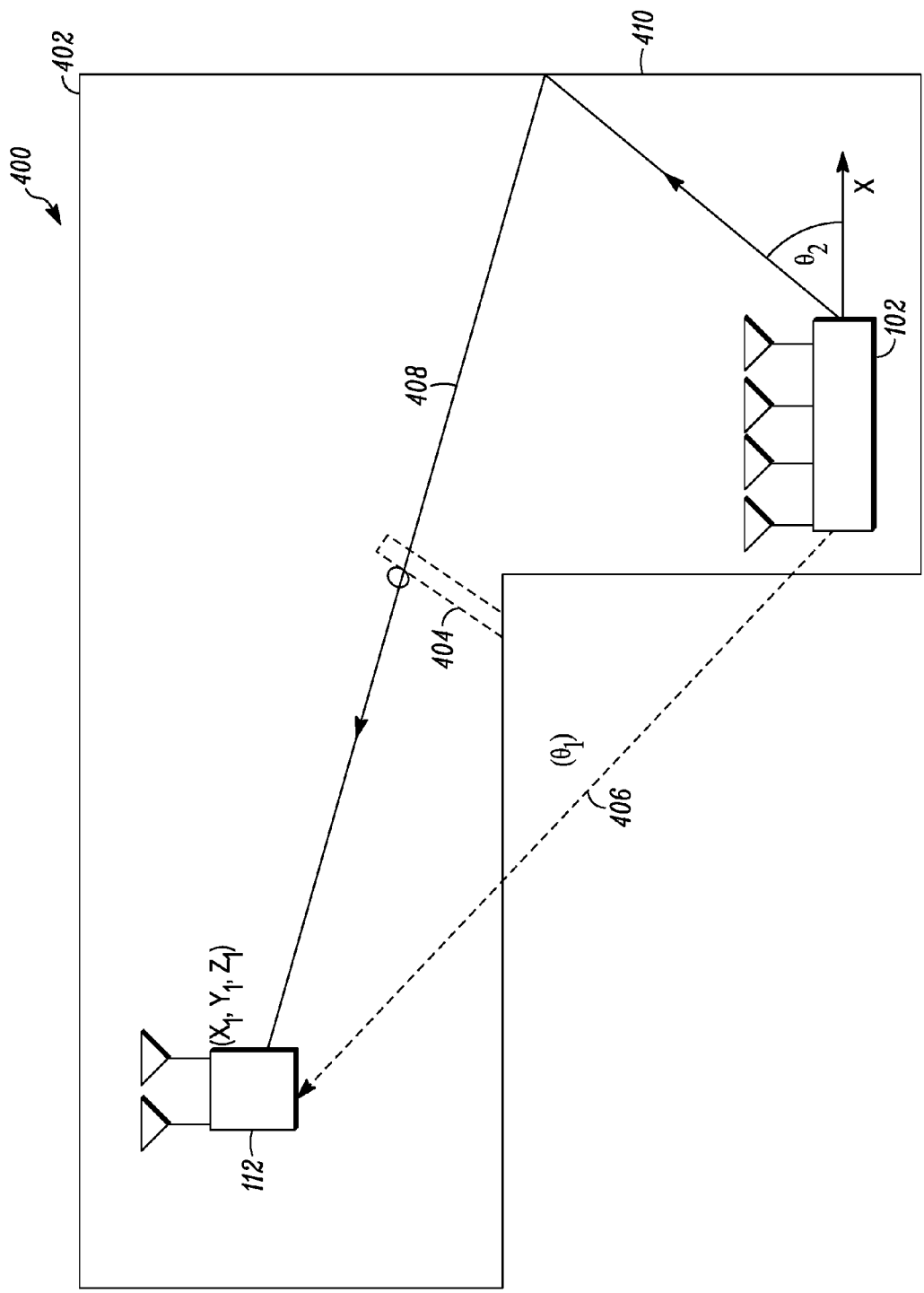
FIG. 4 is a schematic diagram illustrating another environment within which can be implemented methods and apparatus for directing an antenna beam in a communication device in accordance with some embodiments.

The antenna beam parameters $\Theta_1$ determined based on the absolute geographic position of the device 112 are for directing the antenna beam along a direct path to the second communication device. However, either upon antenna beam initiation or when the device 112 has moved after associating with the access point 102, the access point 102 determines that a first reflective path is better than the direct path for beamforming to communicate with the second communication device 112 over the second communication channel. FIG. 4 illustrates an embodiment that allows communication devices to detect and take advantage of reflective paths for improving signal quality of their wireless communications.

More particularly, FIG. 4 illustrates an environment 400 that includes an enclosed room 402 in which both the access point 102 and the mobile device 112 are located. For example, the mobile device 112 has moved into the room 402 while communicating without beamforming with the access point 102 using the 2.4 GHz frequency band but now wants to communicate using the 60 MHz frequency band.

For an embodiment, the access point 102 is configured to periodically receive updates of first location data, which is the location data for the device 112. The access point 102 responsively determines a first set of antenna beam parameters $\Theta_1$ for forming an antenna beam along a direct path 406 to the mobile device 112, which is currently at a location indicated by geographic coordinates of $x_1$, $y_1$, $z_1$. However, using embodiments of the present teachings, for instance method 500 illustrated in FIG. 5, the access point 102 can determine that a reflective path is better for beamforming to the mobile device 112 and then determine a second set of one or more antenna beam parameters $\Theta_2$, also referred to as second antenna beam parameters, for directing the antenna beam a reflective path 408 (shown reflecting from a wall 410).

Block 502 illustrates example functionality that the access point 102 could perform to determine that the reflective path is better than the direct path for communicating with the mobile device 112. For one embodiment, the access point 102 detects a failure to connect to or communicate with the device 112 upon establishing the antenna beam 406 using the first set of antenna beam parameters $\Theta_1$. For another embodiment, the access point 102 can connect to the device 112 but a determined or measured signal quality associated with the direct path fails to meet a signal quality threshold, $TH_{SQ}$, for the communications.

Upon determining to use a reflective path, the access point 102 can determine 504 the second set of antenna beam parameters $\Theta_2$ for directing the antenna beam along the reflective path in a number of ways. For one example, the access point 102 uses a trial and error technique, whereby the access point 102 tries different antenna beam parameters until it determines antenna beam parameters $\Theta_2$ that enable communicating with the device 112 at a signal quality that meets or exceeds $TH_{SQ}$. For another example, the access point 102 selects the antenna beam parameters $\Theta_2$ that enable communicating with the device 112 at a highest measured signal quality.

For yet another example, the access point 102 selects the antenna beam parameters $\Theta_2$ from multiple sets antenna beam parameters, which are stored on the access point 102 or remote to the access point 102 in a database. FIG. 6 illustrates a structure 600 for organizing data for selecting antenna beam parameters for communicating using a reflective path instead of a direct path. The structure 600 is shown as a table having columns 602 and 604 and rows 606, 608, 610, 612, and 614. Column 602 indicates antenna beam parameters for a reflective path, and column 604 indicates location of the communication device, e.g., device 112, to which the access point desires to connect. Each row indicates a different entry in the structure 600, whereby if the device is located at a particular set of Cartesian coordinates, the access point 102 should use the corresponding antenna beam parameters in that entry to detect the antenna beam.

Thus, as shown in the table 600, since the device 112 is located at geographic coordinates of $x_1$, $y_1$, $z_1$, the access point 102, selects the antenna beam parameters $\Theta_2$ to direct an antenna beam along the reflective path 408. Where the device 112 has different location coordinates, as indicated in the rows 608, 610, 612, 614, the access point 102 selects the antenna beam parameters for that entry to direct the antenna beam along a different reflective path.

For one example use case scenario, the structure 600 corresponds to a particular location 402 such as a room in a house or a public area like a coffee shop, which may have certain areas where some direct paths to the access point 102 are obstructed depending on where in the room the device 112 is located. For example, while in her office 402, a user's desk is located at coordinates $x_1$, $y_1$, $z_1$. So, the access point 102 initially selects or switches to the reflective path 408 when the user has her laptop, tablet, or smartphone 112 at or near her desk. Alternatively, a reflective path may simply give a better signal quality and allow beamforming in a higher frequency band than a direct path at certain locations in the room 402. Accordingly, since both the room 402 and the access point 102 are stationary, a database can be built having the structure 600 to allow the access point 102 to quickly select a reflective path depending on where the device 112 is located.

At block 506, the access point 102 performs beamforming using the selected antenna beam parameters $\Theta_2$ for the reflective path 408. While beamforming, the access point obtains 508 updates (refreshes) for the signal quality and for the first location data, which indicates the location of the device 112. These updates can be obtained periodically and/or responsive to one or more triggers, such as a change in RTT or TOF or a change in motion. Additionally, changes in one or more of these parameters might trigger a change in frequency of receiving the updates.

At block 510, the access point 102 analyzes the updated signal quality and first location data to see if there are any changes to either the signal quality and/or the location of the device 112. When changes are detected to either, the access point 102 can, in one embodiment, act in accordance with one or more of the functional blocks 512, 514, or 516 to determine how to beamform in view these detected changes.

For example, the updated first location data may indicate that the device 112 has moved within the room 402. For instance, the user moves from her desk to a sofa. When the access point 102 receives the updates at 508 and determines 510 that the device 112 has moved, the access point 102, responsively, determines 516 another set of parameters for communicating along another path, such as another reflective path (e.g., selected using the table 600) or a direct path to the new device 112 position. The method 500 then returns to block 506 where the access point 102 communicates using the new antenna beam parameters.

Where the device 112 has not moved but the signal quality may have changed due to environmental conditions, the access point compares 512 the updated signal quality to a signal quality threshold $TH_{SQ}$, and in this embodiment uses 514 a time threshold $TH_T$, to determine the beamforming parameters to use in directing the antenna beam. For one example scenario, someone comes into the room 402 and opens a door 404, which blocks the signal path 408. The door partially obstructing the signal path 408 may decrease the signal strength but not to an extent that the signal quality falls below $TH_{SQ}$. Accordingly, the access point 102 continues to operate with the current antenna beam parameters without changing them. However, where the signal quality falls below $TH_{SQ}$ for a time period dictated by $TH_T$, access point 102 determines 516 another set of antenna beam parameters for beamforming at 506. Otherwise, where the time threshold is not exceeded, the access point 102 maintains the current antenna beam parameters for communicating with device 112.

For one embodiment, where the access point 102 changes the antenna beam parameters due to environmental parameters, it does so only temporarily and returns to the original antenna beam parameters $\Theta_2$ for communicating at 506 before receiving additional updates at 508. For another embodiment, the access point 102 continues to operate using the changed antenna beam parameters until the next time that it obtains updates at 508 and detects a change in motion or in signal quality that dictates changing the antenna beam parameters. For yet another embodiment, where the access point 102 detects movement, it increases the frequency of obtaining updates at 508.

Figure 7:
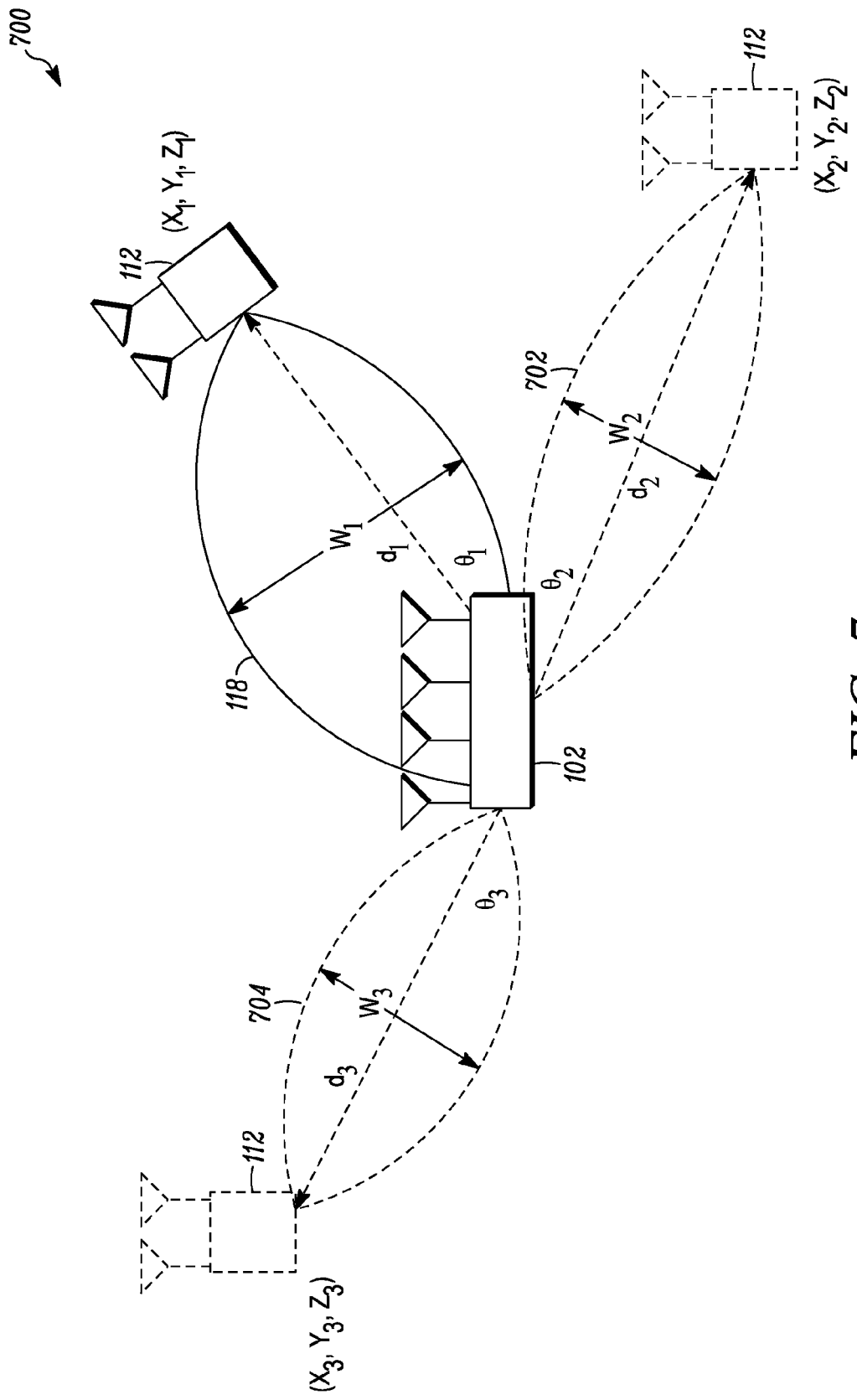
FIG. 7 is a schematic diagram illustrating another environment within which can be implemented methods and apparatus for directing an antenna beam in a communication device in accordance with some embodiments.

FIGS. 7 and 8 illustrate an environment 700, wherein a communication device, e.g., the access point 102, implements a method 800 to adjust beamforming based on changes in distance relative to the device 112. Let's assume that the device 112 starts at a first location $x_1$, $y_1$, $z_1$, wherein access point 102 uses antenna beam parameters $\Theta_1$ to direct an antenna beam 118 having a width $w_1$ to communicate 802 with the device 112, which is at a distance $d_1$. At 804 and 806, the access point 102 receives updates to the first location data for the device 112 and refreshes its own location data if method 800 is, for instance, being performed in a mobile hotspot and also updates the signal quality measurement.

The access point 102 determines 808 the relative distance between itself and device 112 to detect whether the relative distance has changed. If the relative distance is about the same (within some allowable tolerance), the access point 102 proceeds to analyze the current signal quality in light of the signal quality threshold at 812 and in light of the time threshold at 814 to determine whether to maintain 802 the current antenna beam parameters or change them, at 816. The comparisons and functionality performed in blocks 812, 814, and 816 can be similar to the previously described comparisons and functionality performed in blocks 512, 514, and 516, the description of which is not repeated here for the sake of brevity.

Where, at block 808, the access point 102 instead determines that the distance to device 112 has changed, the access point 102 may adjust beamforming at block 810, accordingly. FIG. 7 illustrates the device 112 moving at one instance in time to a location indicated by the coordinates $x_2$, $y_2$, $z_2$ and at another instance in time to a location indicated by the coordinates $x_3$, $y_3$, $z_3$. At location $x_2$, $y_2$, $z_2$, the devices 102 and 112 have a relative distance of $d_2$ that is greater than the distance $d_1$ at location $x_1$, $y_1$, $z_1$. Likewise, at location $x_3$, $y_3$, $z_3$, the devices 102 and 112 have a relative distance of $d_3$ that is greater than the distance $d_1$ at location $x_1$, $y_1$, $z_1$.

Thus, in accordance with the present teachings, for instance in accordance with blocks 306 and 310 described above, the access point 102 determines a set of antenna beams parameters $\Theta_2$ to direct an antenna beam 702 having a width $w_2$ to communicate with the device 112 while at the location $x_2$, $y_2$, $z_2$. Similarly, the access point 102 determines a set of antenna beams parameters $\Theta_3$ to direct an antenna beam 704 having a width $w_3$ to communicate with the device 112 while at the location $x_3$, $y_3$, $z_3$. Since, the devices 102 and 112 are communicating at longer distances in each case, the access point 102 might at block 810 increase the number of antenna elements that it uses to beamform or direct the device 112 to beamform.

For one example, the access point 102 compares the current relative distance to two thresholds. When the relative distance is lower than the first threshold, for instance when the relative distance is $d_1$, the access point 102 beamforms using only two of its four antenna elements. When the relative distance exceed the first distance threshold but is lower than the second distance threshold, for instance when the relative distance is $d_2$, the access point 102 beamforms using all four of its antenna elements. However, where the relative distance exceeds the second threshold, for instance when the relative distance is $d_3$, the access point 102 beamforms using all four of its antenna elements and sends signaling (such as a command or its own location coordinates) to the device 112 to initiate beamsteering by the device 112.

Figure 9:
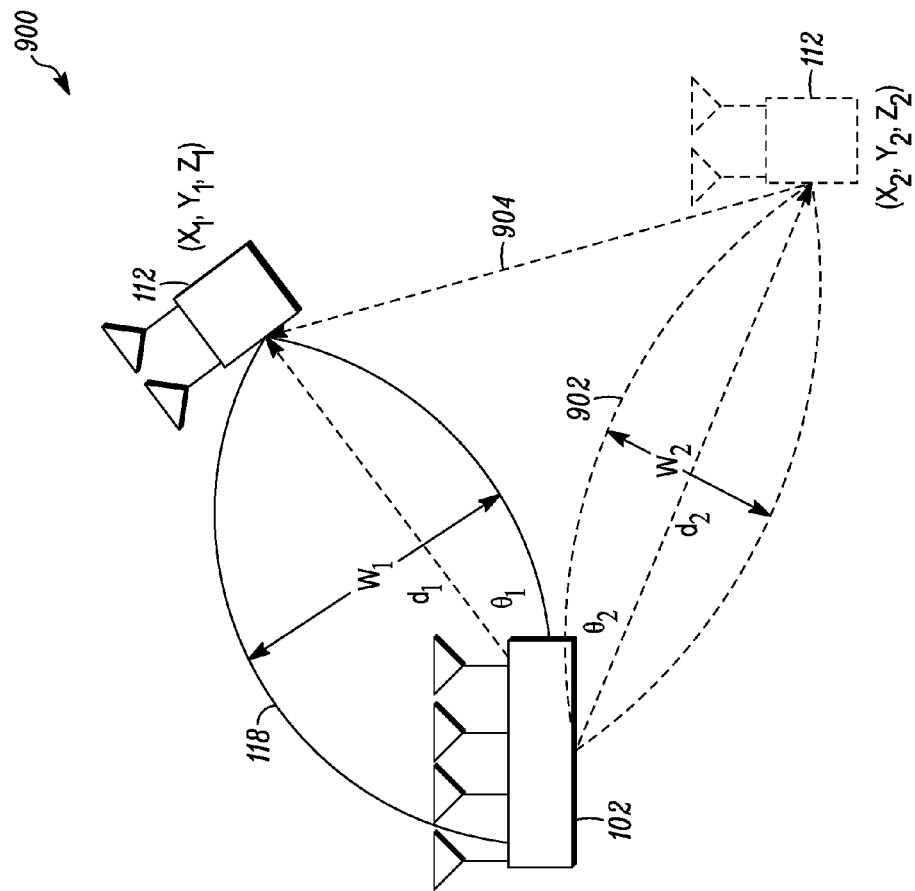
FIG. 9 is a schematic diagram illustrating another environment within which can be implemented methods and apparatus for directing an antenna beam in a communication device in accordance with some embodiments.
Figure 11:
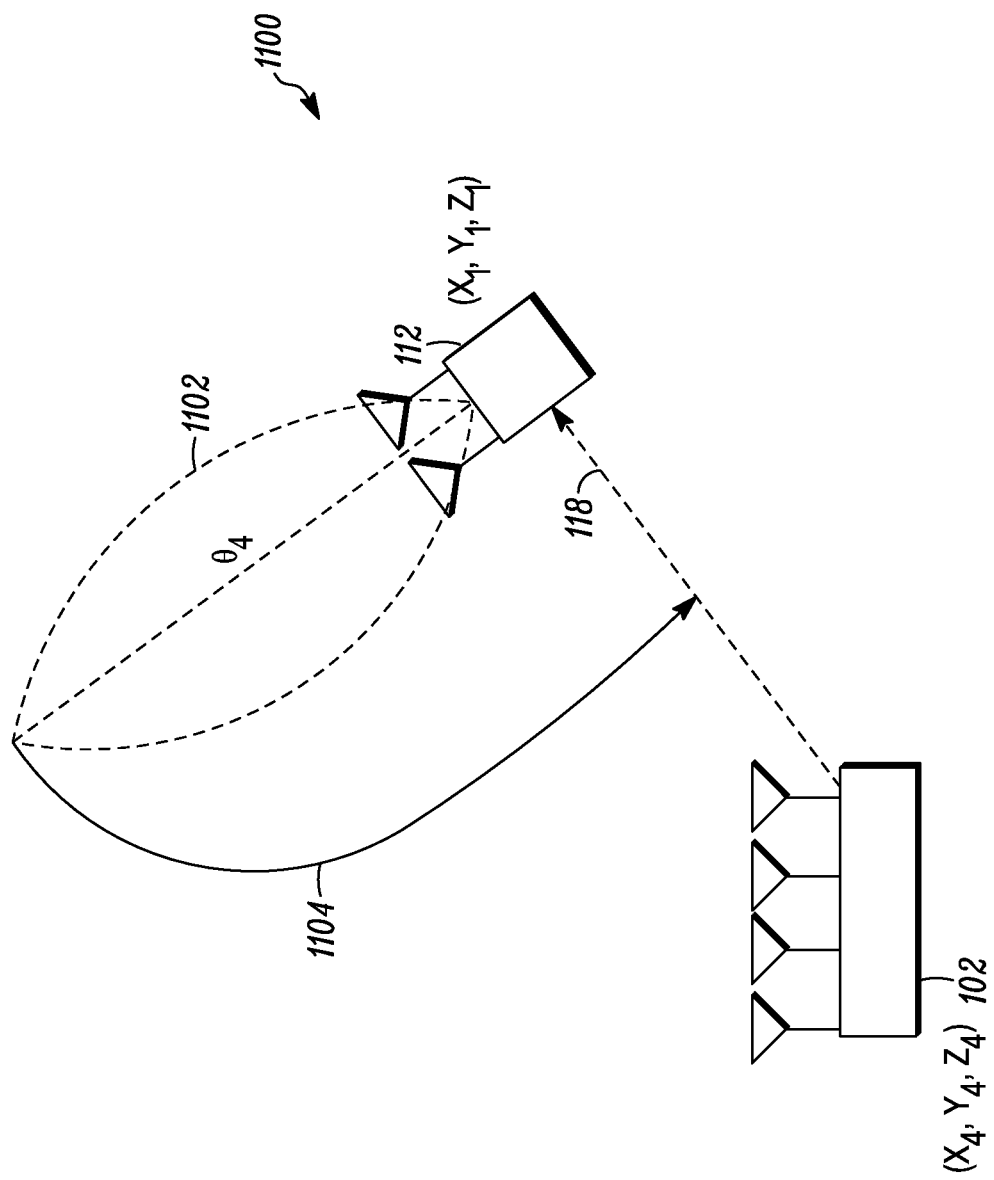
FIG. 11 is a schematic diagram illustrating another environment within which can be implemented methods and apparatus for directing an antenna beam in a communication device in accordance with some embodiments.

FIGS. 9, 10, and 11 illustrate additional embodiments whereby a device can adjust its antenna beam based on motion of another device or its own motion. In these embodiments, the antenna beam adjustments are determined using motion data derived from data provided by sensors on one or both of the devices. A method 1000 illustrated in FIG. 10 is particularly useful when the access point 102 is a mobile Hotspot or Wi-Fi group owner. As such, both devices 102 and 112 can be configured to implement the method 1000 to exchange motion data in order to update their antenna beams while one or both of the devices 102 and 112 are moving. Moreover, the devices 102 and 112 can implement the method 1000 to advantageously update their antenna beam directions to maintain communications, for instance, having a similar quality of service, bit rate, etc., when one or more of the devices are moving.

Motion data for a device is defined as data that indicates movement of the device corresponding to changes in the geographic location of the device and/or changes in orientation relative to the device's internal coordinate system. Moreover, motion data, as used herein, is not derived solely based on conditions of the channel over which the motion data is sent but is instead entirely or at least partially based on data measured by or received into hardware sensors of the device. Accordingly, the motion data can be generated using sensors on the device, such as an accelerometer, a gyroscope, etc., and can indicate one or more motion parameters such as speed, direction, velocity, and/or orientation of the device.

The motion data exchanged between the devices 102 and 112 could take any suitable forming including, but not limited to, raw motion sensor data from the sensing device that is sent to the other device, motion sensor data that is processed by the sensing device and the processed data sent to the other device, motion vectors such as a velocity vector, etc. For other embodiments, the motion data corresponds to a modality, of the communication device, which indicates user activity. For example, a first motion modality representing a user of the device walking could correspond to and be interpreted by a processor as a first range of speeds. Whereas, a second motion modality representing a user of the device running could correspond to and be interpreted by a processor as a second range of speeds, which may or may not have some overlap in speeds with the first range of speeds of the first motion modality. Other motion modalities could be envisioned for various user activities such as jogging, speed walking, etc.

Figure 12:
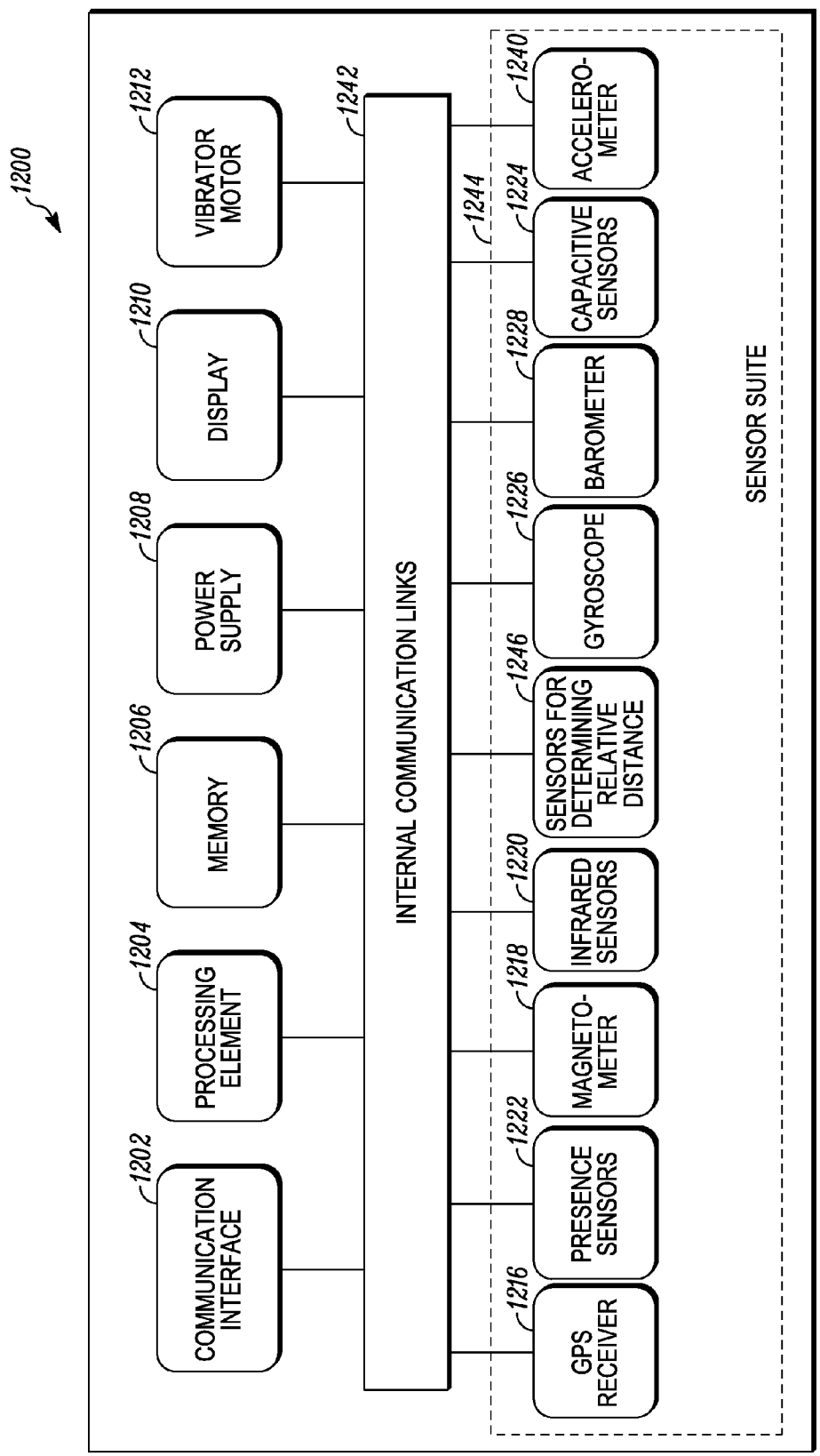
FIG. 12 is a block diagram illustrating example components of a mobile communication device configured for directing an antenna beam in accordance with some embodiments.

Since the embodiments described herein can be implemented using mobile devices, FIG. 12 illustrates example components 1200 of a mobile device. As shown, the components 1200 include a communication interface 1202, a processing element 1204, memory 1206, a power supply 1208, and sensors 1244, which are operatively coupled using internal communication links 1242. The components 1202, 1204, 1206, 1208, and 1242 can be configured to operate similarly to the communication interface 202, processing element 204, memory 206, power supply 208, and internal communication links 242, respectively, described above by reference to the components 200 of an access point, the description of which is not repeated here for brevity. Additionally, the sensors 1244 of a GPS receiver 1216, a magnetometer 1218, a gyroscope 1226, a barometer 1228, an accelerometer 1240, and sensors 1226 for determining relative distance can be configured to operate similarly to the GPS receiver 216, the magnetometer 218, the gyroscope 226, the barometer 228, the accelerometer 240, and the sensors 226 for determining relative distance, respectively, of the sensors 244 of an access point as described above, the description of which is not repeated here for brevity.

The mobile device components 1200 further include a display 1210, a vibrator motor, and additional sensors 1244 that include one or more presence sensors 1222, one or more infrared sensors 1220, and one or more capacitive sensors 1224. The display 1210 can, for instance, be a touchscreen that is both a visual output component and a means of receiving tactile input of a user for various functions of the mobile device. The vibrator or vibration motor 1212 is a motor that is improperly balanced and can be used in devices for indicators and, in accordance with at least some of the embodiments described herein, to change the orientation of a device. The sensors 1222, 1220, and 1224 represent sensors that use different technologies for sensing an object touching or near the device including, but not limited to, a user's hand or other body part or an object on which the device is resting such as a table. Sensors 1222, 1220, and 1224 can be placed at various locations on the mobile device.

Regarding FIG. 10, the functionality shown therein is described primarily from the vantage point of the access point 102 performing the method 1000. However, the description also applies at least in some respects to the mobile device 112 performing the method 1000. Additionally, for purposes of this example implementation, let's assume that the devices 102 and 112 have already performed the 802.11 association procedure and at least the access point 102 is currently engaged in beamforming toward the mobile device 112.

Accordingly, as illustrated within an environment 900 of FIG. 9, the device 112 starts at a first location $x_2$, $y_2$, $z_2$, wherein the access point 102 uses antenna beam parameters $\Theta_2$ to direct 1002 an antenna beam 902 having a width $w_2$ in a first direction to communicate with the device 112, which is at a distance $d_2$. During some time frame or some regularly occurring time frames, for example, the access point 102 receives 1004 motion data updates from its sensors and from the device 112. The device 102 may also receive 1004 signal quality updates.

The updated motion data is analyzed at block 1006. When the motion data update indicates no motion by either device 102 or 112 the method proceeds toward blocks 1008 and 1010 to analyze the signal quality data whether the device 102 should maintain the current antenna beam parameters and continue monitoring 1004 the motion and signal quality data or change the direction antenna beam, at block 1012, such as by determining and applying a second set of antenna beam parameters or otherwise changing the beamforming.

For example, the access point 102 determines based on updates to the motion data and the signal quality that changes to the signal quality are caused by environmental conditions instead of movement of the first or second communication devices, and responsively, maintains the second set of antenna beam parameters for directing the antenna beam. For another example, the access point 102 determines based on updates to the motion data and the signal quality that changes to the signal quality are caused by environmental conditions instead of movement of the first or second communication devices, and responsively, determines a different set of antenna beam parameters for, e.g., temporarily directing the antenna beam along a different path than the path associated with the current set of antenna beam parameters. The analysis performed by the access point 102 in blocks 1008 and 1010 can be similar to the analysis performed and described above by reference to blocks 512 and 514 of the method 500 illustrated in FIG. 5, the description of which is not repeated here for brevity.

When the access point 102 instead determines 1008 from the motion data update that either the access point 102, the mobile device 112 or both are moving, the access point 102 can change 1012 the direction of its antenna beam from the first direction to a second direction to maintain communication with the mobile device 112, for instance while staying within the same frequency band. For one example, the motion updates for the mobile device 112, e.g., a velocity vector, indicates that the mobile device 112 is moving along a path 904 at a certain speed. Using this velocity vector, the access point 102 can track the movement of the mobile device 112 and, for example, anticipate the location of the mobile device 112 at a given time and adjust its antenna beam parameters, at block 1012, to move the antenna beam in the anticipated direction or to the anticipated relative location of the mobile device 112.

To improve these location predictions, the access point 102 could also receive 1018 location data updates from the mobile device 112, as described earlier for instance by reference to blocks 302 and 304 of method 300. Additionally, the access point 102 can obtain multipath data if available, generate or update a beamforming matrix, which it can use to fine-tune the location data for mobile device 112 and, thereby, fine-tune the updated beamforming parameters.

As illustrated, the antenna parameters are for directing the antenna beam along a direct path to the mobile device 112. However, depending on other factors including whether there are physical obstructions to the communications between the device 102 and 112, the updated antenna beam parameters may be for directing the antenna beam along a reflective path to the mobile device 112. In such an instance, the access point 102 can use the method 500 of FIG. 5 to select 1012 updated antenna beam parameters to use a reflective path to the mobile device 112. For example, the access point 102 can select the updated set of antenna beam parameters from multiple sets of antenna beam parameters stored on the device 102 or on a server remote from the device 102. Alternatively, the access point 102 could implement a trial and error approach where it selects the updated antenna beam parameters as enabling communicating with the device 112 at a signal quality that meets a signal quality threshold and/or at a highest measured signal quality.

Additionally, to redirect the antenna beam as the mobile device 112 moves, the access point 102 can determine a different beamforming to change the direction of its antenna beam from the first direction to the second direction. For an embodiment, determining beamforming includes determining a number of antenna elements to operate to create the antenna beam. Furthermore, the access point 102 can determine, based on the motion data and the location data, an expected distance between the devices 102 and 112. The number of antenna elements to operate is, thereby, determined based on the expected distance. For instance, the access point 102 may increase the number of antenna elements that it operates as the expected distance increases and decrease the number of antenna elements that it operates as the expected distance decreases.

For at least one other embodiment, the access point 102 directs the device 112 to steer its antenna beam toward the access point 102 or the device 112 contemporaneously performs method 1000 (as mentioned above). Thus, the mobile device 112 determines to steer its beam to maintain the quality and speed of the link while the device 112 is moving or when it stops moving, for instance at a location indicated by coordinates $x_1$, $y_1$, $z_1$. FIG. 11 further shows an environment 1100, wherein the access point 102 is at a location indicated by coordinates $x_4$, $y_4$, $z_4$.

For one example implementation, while stationary at the location $x_1$, $y_1$, $z_1$ the mobile device 112 receives the location data for the device 102 and steers a beam 1102 in a direction 1104 toward the access point 102 using the antenna beam parameters $\Theta_4$. The mobile device 112 can determine to redirect its antenna beam by beamforming in one embodiment and in another embodiment can redirect its antenna beam by manual beamsteering to change the orientation of the device 112. For one example, the device 112 mechanically changes its orientation, for instance using the vibrator motor 1212. For another example, the device 112 indicates using an output component, such using a visual indication on the display 1210 or an audio indication through a set of speakers (not shown), for a user of the device to reorient the device along the trajectory 1104. The access point 102, if mobile, may also be configured for this manual beamsteering functionality.

For yet another embodiment, which can be implemented for instance by a mobile access point 102 or the mobile device 112, either device can receive sensor data (e.g., from one or more of the sensors 1222, 1220, and/or 1224, that one or more of the antenna elements is blocked by an object. Accordingly, the device selects only antenna elements that are not blocked to steer its antenna beam. Therefore, in this embodiment, the number of antenna elements to operate is further determined based on this sensor data.

Additionally, where the device implementing the method 1000 determines, at block 1014, that the change in the direction of its antenna beam was not due to signal quality but was due to device motion, the device increases 1016 the frequency of updates to the motion data and the signal quality updates, performed at block 1004. This can better enable the device to track motion, especially as the speed of the tracked device increases. For example, with this embodiment, while the mobile device 112 moves along the path 904, the access point 102 increases the frequency of obtaining motion data and location data from the device 112 to more quickly adjusts its antenna beam as a user is, for example, walking with her device and streaming video data using a 60 GHz connection.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

The term "coupled" as used herein is defined as directly or indirectly connected, mechanically, electrically, inductively, or otherwise. Moreover, in some instances coupled may also mean included within. For example, a processor being "coupled" to a Wi-Fi transceiver chip can mean that the processor is included as a component on the chip.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a first communication device, the method comprising:
    receiving first location data that indicates the location of a second communication device, wherein the first location data is received over a first communication channel;
    determining, based on the first location data, a first set of antenna beam parameters for directing an antenna beam used to communicate with the second communication device over a second communication channel;
    determining second location data that indicates a location of the first communication device; and
    determining, based on the first and second location data, a first direction of the second communication device relative to the first communication device;
    wherein the first set of antenna beam parameters is for directing the antenna beam in the first direction.

2. The method of claim 1, wherein the antenna beam has a higher gain than an achievable gain when the first communication device performs an omnidirectional scan.

3. The method of claim 1, wherein the first set of antenna beam parameters is determined before obtaining multipath data for calculating a beamforming matrix of at least one or more phase values.

4. The method of claim 1, wherein the first set of antenna beam parameters is determined before completing an 802.11 association procedure with the second communication device.

5. The method of claim 1, wherein the first and second communication channels are characterized by different frequency bands for a same wireless communication technology.

6. The method of claim 5, wherein the first and second communication channels are characterized by different frequency bands for Wi-Fi.

7. The method of claim 1, wherein the first and second communication channels are characterized by different communication technologies.

8. The method of claim 1, wherein the first communication channel has a longer range than the second communication channel.

9. The method of claim 1, wherein the first and second location data indicate one or both of: geographic position; communication device orientation.

10. The method of claim 1, wherein the first set of antenna beam parameters is for directing the antenna beam along a direct path to the second communication device.

11. The method of claim 10 further comprising:
    determining that a first reflective path is better than the direct path for communicating with the second communication device over the second communication channel;
    determining a second set of antenna beam parameters for directing the antenna beam along the reflective path.

12. The method of claim 11, wherein determining the second set of antenna beam parameters comprises one or more of:

selecting the second set of antenna beam parameters from multiple sets of antenna beam parameters stored on the first communication device;

selecting the second set of antenna beam parameters from multiple sets of antenna beam parameters stored remote from the first communication device;

selecting the second set of antenna beam parameters as enabling communicating with the second communication device at a highest measured signal quality;

selecting the second set of antenna beam parameters as enabling communicating with the second communication device at a signal quality that meets a signal quality threshold.

13. The method of claim 11, wherein determining that the first reflective path is better than the direct path comprises one of:

detecting a failure to connect to the second communication device using the first set of antenna beam parameters; or detecting a first signal quality, associated with the direct path, which fails to meet a signal quality threshold.

14. The method of claim 1 further comprising:

determining, based on the first and second location data, a distance between the first and second communication devices;

determining beamforming based on the distance between the first and second communication devices.

15. The method of claim 14, wherein determining beamforming comprises determining, based on the distance between the first and second communication devices, a number of antenna elements to enable for directing the antenna beam using the first set of antenna beam parameters.

16. The method of claim 14, wherein determining beamforming comprises:

detecting that the distance between the first and second communication devices exceeds a distance threshold;

causing the second communication device to beamform in order to communicate with the first communication device using the second communication channel.

17. A first communication device configured for directing an antenna beam, the first communication device comprising:

a communication interface comprising a transceiver system operatively coupled to an antenna system, wherein the communication interface is configured to operate over a first communication channel to receive first location data that indicates the location of a second communication device and second location data that indicates a location of the first communication device, and wherein the communication interface is further configured to operate over a second communication channel having a shorter range than the first communication channel;

a processing element operatively coupled to the communication interface and configured to determine, based on the first location data, a first direction of the second communication device relative to the first communicative device and a first set of antenna beam parameters for controlling the antenna system to direct an antenna beam in the first direction in order to communicate with the second communication device using the second communication channel.

* * * * *